United States Patent
Dames et al.

(12) 
(10) Patent No.: US 6,376,094 B1
(45) Date of Patent: Apr. 23, 2002

(54) LAMINATION ADHESIVES

(75) Inventors: Burkhardt Dames, Neuwied; Karl-Heinz Schumacher; Jürgen Barwich, both of Neustadt; Hans-Joachim Fricke, Dirmstein, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/308,649

(22) PCT Filed: Nov. 18, 1997

(86) PCT No.: PCT/EP97/06424

§ 371 Date: Jun. 1, 1999

§ 102(e) Date: Jun. 1, 1999

(87) PCT Pub. No.: WO98/23656

PCT Pub. Date: Jun. 4, 1998

(30) Foreign Application Priority Data

Nov. 29, 1996 (DE) .......................................... 196 49 383

(51) Int. Cl.⁷ .......................... B32B 27/32; B32B 29/00
(52) U.S. Cl. ....................................... 428/514; 428/520
(58) Field of Search .......................... 428/355 AC, 520, 428/522, 514; 156/332; 524/460, 461

(56) References Cited

U.S. PATENT DOCUMENTS 5,474,638 A  12/1995  Kohlhammer et al. ... 156/308.2
6,136,903 A  * 10/2000  Su et al. ..................... 524/167

FOREIGN PATENT DOCUMENTS

| EP | 0 622 434 | 11/1994 |
|----|-----------|---------|
| JP | 04 304 281 | * 10/1992 |
| JP | 08157799 | * 6/1996 |
| WO | WO 92/12213 | 7/1992 |

* cited by examiner

Primary Examiner—Paul Thibodeau
Assistant Examiner—D. Lawrence Tarazano
(74) Attorney, Agent, or Firm—Oblon, Spivak, McClelland, Maier & Neustadt, P.C.

(57) ABSTRACT

A polymer composed of
  from 5 to 95% by weight of a mixture of at least one $C_2$–$C_4$-alkyl acrylate and at least one $C_6$–$C_{12}$-alkyl acrylate (monomers a),
  from 5 to 30% by weight of ethylenically unsaturated compounds having a glass transition temperature of above 0° C. and containing no functional groups other than the ethylenically unsaturated group (monomers b),
  from 0 to 10% by weight of ethylenically unsaturated compounds having at least one acid group or acid anhydride group (monomers c), and
  from 0 to 60% by weight of further ethylenically unsaturated compounds (monomers d),
the amounts by weight being based on the emulsion polymer.

25 Claims, No Drawings

LAMINATION ADHESIVES

BACKGROUND OF THE INVENTION

1. Field of the Invention

The invention relates to polymers composed of from 5 to 95% by weight of a mixture of at least one $C_2$–$C_4$-alkyl acrylate and at least one $C_6$–$C_{12}$-alkyl acrylate (monomers a), from 5 to 30% by weight of ethylenically unsaturated compounds having a glass transition temperature of above 0° C. and containing no functional groups other than the ethylenically unsaturated group (monomers b), from 0 to 10% by weight of ethylenically unsaturated compounds a having at least one acid group or acid anhydride group (monomers c), and from 0 to 60% by weight of further ethylenically unsaturated (compounds (monomers d), the amounts by weight being based on the polymer.

The invention relates additionally to the use of the polymers as adhesives, especially as laminating adhesives, in other words for producing laminates.

2. Description of the Background

The use of aqueous polymer dispersions as adhesives for producing laminates, in other words as laminating adhesives, is known from EP-A-622 434 or WO 92/12213, for example.

In practice, laminating adhesives have to meet a large number of different requirements. For example, laminating adhesives are required to be universally applicable; in other words, they should be equally suitable for the bonding of different polymer films, for example of polyethylene (PE), oriented polypropylene (OPP), polyamide (PA) or polyethylene terephthalate (PETP), with one another and for bonding polymer films with paper or else, in particular, with aluminum foils or metallized polymer films.

The laminating adhesives should have good adhesion to substrates and, after laminating, should bring about high strength of the resulting film laminates.

Since the film laminates are often transparent, the laminating adhesives must also be free from fine coagulum as well as being resistant to ageing and stable to light and exhibiting little foaming.

Processing in the laminating units requires high stability to shearing and good flow properties. Moreover, aqueous systems are desirable in principle to avoid solvent wastes and solvent emissions.

A particular requirement is for high immediate strength of the laminates produced. A high immediate strength (peel strength, measured directly after the production of the laminate) offers the advantage that the film laminate can be subjected rapidly to further processing. This further processing may be the production of a triple laminate starting from the dual laminate, or further operations on the laminate (cutting, punching, folding, sealing).

The aqueous polymer dispersions known to date do not go far enough toward meeting the requirements placed on laminating adhesives. In particular, the immediate strength of the film laminates is too low.

SUMMARY OF THE INVENTION

It is an object of the present invention to remedy this situation.

We have found that this object is achieved by the polymer defined above and by the use thereof, or of the aqueous dispersion of the polymer, as an adhesive for producing laminates—a laminating adhesive.

DETAILED DESCRIPTION OF THE PREFERRED EMBODIMENTS

The novel polymer is composed of the monomers a) to d) defined at the outset.

The monomers a) comprise a mixture of at least one $C_2$–$C_4$-alkyl acrylate and at least one $C_6$–$C_{12}$-alkyl acrylate.

The $C_2$–$C_4$-alkyl acrylate is especially n-butyl acrylate or ethyl acrylate. n-Butyl acrylate is particularly preferred.

Examples of suitable $C_6$–$C_{12}$-alkyl acrylates are n-hexyl, 2-ethylhexyl, octyl, decyl and dodecyl acrylate.

Preference is given to $C_8$-alkyl acrylates, especially 2-ethylhexyl acrylate.

The proportion of the $C_2$–$C_4$-alkyl acrylate is preferably from 10 to 90% by weight, with particular preference from 20 to 75% by weight and, with very particular preference, from 30 to 70% by weight, and the proportion of the $C_6$–$C_{12}$-alkyl acrylates is preferably from 90 to 10% by weight, with particular preference from 25 to 80% by weight and, with very particular preference, from 30 to 70% by weight, these figures by weight being based in each case on the overall amount of the monomers a).

Monomers a) have a glass transition temperature of below 0° C.

Monomers b) are monomers which other than the ethylenically unsaturated group have no functional group, in other words no hydroxyl, acid, acid anhydride, nitro, epoxy or primary, secondary or tertiary amino group. Monomers b), or more accurately the homopolymers of the monomers b), have a glass transition temperature of above 0° C., preferably above 15° C.

The glass transition temperature of the polymer can be determined by conventional methods such as differential thermal analysis (DTA) or differential scanning calorimetry (DSC) (see for example ASTM 3418/82, midpoint temperature).

Examples of possible monomers b) are $C_1$–$C_{20}$-alkyl (meth)acrylates, vinyl esters of carboxylic acids with up to 20 carbons, vinylaromatic compounds of up to 20 carbons, ethylenically unsaturated nitriles, and vinyl halides, provided they have the glass transition temperature stated above.

Particularly suitable alkyl (meth)acrylates are methyl methacrylate, methyl acrylate, n-butyl methacrylate and tert-butyl acrylate.

Methyl acrylate, methyl methacrylate and butyl methacrylate are preferred.

Examples of vinyl esters of $C_1$–$C_{20}$ carboxylic acids are vinyl laurate, stearate, propionate and acetate and Versatic acid vinyl ester.

Suitable vinylaromatic compounds are vinyltoluene, α- and p-methylstyrene, α-butylstyrene, 4-n-butylstyrene, 4-n-decylstyrene and, preferably, styrene. Examples of nitriles are acrylonitrile and methacrylonitrile.

The vinyl halides are ethylenically unsaturated compounds substituted by chlorine, fluorine or bromine, preferably vinyl chloride and vinylidene chloride.

Monomers c) are, for example, ethylenically unsaturated monomers having carboxyl groups, such as (meth)acrylic acid, maleic acid, ethylenically unsaturated acid anhydrides or monoesters, such as maleic anhydride or maleic or fumaric monoester, present in the polymer. Monomers having sulfo or sulfonate groups are not mandatory constituents of the novel polymer.

The further monomers, d), can be of any desired type. Preferably, mention may be made, for example, of $C_1$–$C_{10}$- hydroxyalkyl (meth)acrylates, or monomers listed under monomers b), having a glass transition temperature of below 0° C.

The novel polymer consists preferably of

| from 65 to 95 | % by weight | of monomers a) |
| from 5 to 25 | % by weight | of monomers b) |
| from 0 to 10 | % by weight | of monomers c) |
| from 0 to 10 | % by weight | of monomers d) | and with particular preference of

| from 65 to 92.5 | % by weight | of monomers a) |
| from 5 to 25 | % by weight | of monomers b) |
| from 2.5 to 10 | % by weight | of monomers c) |
| from 0 to 10 | % by weight | of monomers d). |

The glass transition temperature of the polymer can be determined by the DTA or DSC methods referred to above.

The glass transition temperature of the polymer is preferably below 60° C. and in particular is from −50 to +60° C., with particular preference from −30 to +40° C. and, with very particular preference, from −30 to +20° C.

The polymer is prepared preferably by emulsion polymerization, and is therefore an emulsion polymer.

Alternatively, preparation can take place by solution polymerization and subsequent dispersion in water.

In the case of emulsion polymerization use is made of ionic and/or nonionic emulsifiers and/or protective colloids, or stabilizers, as surface-active compounds.

A detailed description of suitable protective colloids is given in Houben-Weyl, Methoden der organischen Chemie, Volume XIV/1, Makromolekulare Stoffe, Georg-Thieme Verlag, Stuttgart, 1961, pp. 411 to 420. Suitable emulsifiers include anionic, cationic and nonionic emulsifiers. Emulsifiers are preferably employed exclusively as accompanying surface-active substances; their molecular weights, in contrast to the protective colloids, are usually below 2000 g/mol. Where mixtures of surface-active substances are used the individual components must of course be compatible; in case of doubt, this can be checked by means of a few preliminary experiments. It is preferred to use anionic and nonionic emulsifiers as surface-active substances. Customary accompanying emulsifiers are, for example, ethoxylated fatty alcohols (EO units: 3 to 50, alkyl: $C_8$ to $C_{36}$), ethoxylated mono-, di- and trialkylphenols (EO units: 3 to 50, alkyl: $C_4$ to $C_9$), alkali metal salts of dialkyl esters of sulfosuccinic acid, and alkali metal salts and ammonium salts of alkyl sulfates (alkyl: $C_8$ to $C_{12}$), of ethoxylated alkanols (EO units: 4 to 30, alkyl: $C_{12}$ to $C_{18}$), of ethoxylated alkylphenols (EO units: 3 to 50, alkyl: $C_4$ to $C_9$), of alkylsulfonic acids (alkyl: $C_{12}$ to $C_{18}$) and of alkylarylsulfonic acids (alkyl: $C_9$ to $C_{18}$).

Further suitable emulsifiers are compounds of the formula II

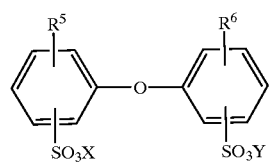

(II)

where $R^5$ and $R^6$ are hydrogen or $C_4$–$C_{14}$-alkyl but are not both hydrogen, and X and Y can be alkali metal and/or ammonium ions. $R^5$ and $R^6$ are preferably linear or branched alkyl of 6 to 18 carbons, and especially 6, 12 or 16 carbons, or hydrogen, but are not both simultaneously hydrogen. X and Y are preferably sodium, potassium or ammonium ions, sodium being particularly preferred. Particularly advantageous compounds II are those in which X and Y are sodium, $R^5$ is branched alkyl of 12 carbons and $R^6$ is hydrogen or $R^5$. In many cases use is made of industrial mixtures having a proportion of from 50 to 90% by weight of the monoalkylated product, an example being Dowfax® 2A1 (trademark of Dow Chemical Company).

Suitable emulsifiers are also given in Houben-Weyl [loc. cit.], pages 192 to 208.

Examples of commercial emulsifiers are Dowfax® 2A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, Disponil FES 77, Lutensol AT 18, Steinapol VSL and Emulphor NPS 25.

The surface-active substance is usually used in amounts of from 0.1 to 10% by weight, based on the monomers to be polymerized.

Examples of water-soluble initiators for the emulsion polymerization are ammonium salts and alkali metal salts of peroxodisulfuric acid, for example sodium peroxodisulfate, hydrogen peroxide or organic peroxides, for example tert-butyl hydroperoxide.

Reduction-oxidation (redox) initiator systems are particularly suitable. They consist of at least one, usually inorganic reducing agent and an inorganic or organic oxidizing agent.

The oxidation component may comprise, for example, the emulsion polymerization initiators already mentioned above.

The reduction component comprises, for example, alkali metal salts of sulfurous acid, for example sodium sulfite, sodium hydrogen sulfite, alkali metal salts or disulfurous acid, such as sodium disulfite, bisulfite addition compounds of aliphatic aldehydes and ketones, such as acetone bisulfite, or reducing agents such as hydroxymethanesulfinic acid and its salts, or ascorbic acid. The redox initiator systems may also incorporate soluble metal compounds whose metallic component is able to exist in a plurality of valence states.

Examples of common redox initiator systems are ascorbic acid/iron(II) sulfate/sodium peroxodisulfate, tert-butyl hydroperoxide/sodium disulfite, tert-butyl hydroperoxide/Na hydroxymethanesulfinate. The individual components, for example the reduction component, can also be mixtures, for example a mixture of the sodium salt of hydroxymethanesulfinic acid and sodium disulfite.

These compounds are mostly employed in the form of aqueous solutions, the lower concentration being determined by the amount of water which is acceptable in the dispersion and the upper concentration by the solubility of the relevant compound in water. In general the concentration is from 0.1 to 30% by weight, preferably from 0.5 to 20% by weight and, with particular preference, from 1.0 to 10% by weight, based on the solution.

The amount of initiator is generally from 0.1 to 10% by weight, preferably from 0.5 to 5% by weight, based on the monomers to be polymerized. It is also possible to use a plurality of different initiators in the emulsion polymerization.

In the course of polymerization it is possible to employ regulators, for example in amounts of from 0 to 0.8 parts by weight per 100 parts by weight of the monomers to be polymerized. Their function is to reduce the molar mass. Suitable examples are compounds having a thiol group, such as tert-butyl mercaptan, ethylhexyl thioglycolate, mercaptoethanol, mercaptopropyl-trimethoxysilane or tert-dodecyl mercaptan. In the case of use as an adhesive for composite-film lamination, the proportion of said regulator can in particular be from 0.05 to 0.8 parts by weight, preferably from 0.1 to 0.5 parts by weight, per 100 parts by weight of the monomers to be polymerized. Where the intended use is as an adhesive for high-gloss film lamination, the use of a regulator is less preferred. The regulators contain no polymerizable, ethylenically unsaturated group. They cause termination of the polymerization chain and are therefore attached terminally to the polymer chains.

The emulsion polymerization takes place generally at from 30 to 130° C., preferably from 50 to 90° C. The polymerization medium can consist either of water alone or of mixtures of water and water-miscible liquids, such as methanol. Preferably, water alone is used. The emulsion polymerization can be carried out either as a batch process or in the form of a feed process, including a staged or gradient procedure. Preference is given to the feed process, in which a portion of the polymerization mixture is introduced as initial charge, heated to the polymerization temperature and then partially polymerized, with the remainder of the polymerization mixture being supplied subsequently to the polymerization zone, usually by way of a plurality of spatially separate feed streams of which one or more comprise the monomers in pure or in emulsified form, these feed streams being supplied continuously, in stages or under a concentration gradient, during which the polymerization is maintained. A seed polymer may also be included in the initial charge in order, for example, to achieve better regulation of particle size.

The manner in which the initiator is added to the polymerization vessel in the course of the free-radical aqueous emulsion polymerization is familiar to the person of average skill in the art. It can either be included entirely in the initial charge to the polymerization vessel or else added, continuously or in stages, at the rate at which it is consumed in the course of the free-radical aqueous emulsion polymerization. In each individual case this will depend, as familiar per se to the person of average skill in the art, both on the chemical nature of the initiator system and on the polymerization temperature. Preferably, a portion is included in the initial charge and the remainder is supplied to the polymerization zone at the rate at which it is consumed.

In order to remove residual monomers it is common to add initiator even after the end of the actual emulsion polymerization, in other words after a monomer conversion of at least 95%.

In the case of the feed process the individual components can be added to the reactor from above, through the side or from below, through the reactor floor.

In the emulsion polymerization, aqueous dispersions of the polymer are obtained generally with solids contents of from 15 to 75% by weight, preferably from 40 to 75% by weight.

For a high space/time yield of the reactor, dispersions with a very high solids content are preferred. In order to be able to achieve solids contents >60% by weight a bimodal or polymodal particle size should be established, since otherwise the viscosity becomes too high and the dispersion can no longer be handled. A new particle generation can be produced, for example, by adding seed (EP 81 083), excess amounts of emulsifier, or miniemulsions. Another advantage associated with the low viscosity at high solids content is the improved coating behavior at high solids contents. One or more new generations of particles can be produced at any desired point in time. This is guided by the target particle size distribution for a low viscosity.

The novel polymer can be used as an adhesive, for example a pressure-sensitive adhesive. The polymer is preferably used in the form of its aqueous dispersion.

The novel dispersion is particularly suitable as a laminating adhesive for bonding substrates of large surface area, in other words for producing laminates.

When used as an adhesive, especially a laminating adhesive, the dispersion may comprise further conventional additives, for example wetting agents, thickeners, protective colloids, light stabilizers or biocides.

The novel polymer or dispersion does not require the addition of tackifying resins (tackifiers) or plasticizers nor the addition of crosslinkers, other reactive components or co-components in order to achieve the desired properties when used as an adhesive.

In the case of use as a laminating adhesive, the novel dispersion is applied to the substrates of large surface area preferably in a layer thickness of from 0.1 to 20, with particular preference from 2 to 7 $g/m^2$, for example by knife-coating, brushing, etc.

After a short time for evaporating the dispersion water (preferably after from 1 to 60 seconds) the coated substrate can be laminated with a second substrate, it being possible for the temperature to be, for example, from 20 to 200, preferably from 20 to 70° C. and for the pressure to be, for example, from 1 to 30, preferably from 3 to 20 $N/m^2$.

Examples of suitable substrates are polymer films, especially those of polyethylene, oriented polypropylene, polyamide, polyethylene terephthalate, polyacetate, cellophane, polymer films (vapor-)coated with metal (e.g. aluminum) (metallized films for short) or else paper, card or metal foils, especially those of aluminum. Said foils and films can also be printed with printing inks, for example.

The novel polymer or dispersion can be used as an adhesive for high-gloss film lamination and, preferably, as an adhesive for composite-film lamination.

In the case of high-gloss film lamination, paper or card are bonded to transparent polymer films.

In the case of composite-film lamination, the abovementioned substrates (but not paper or card) can be bonded to one another. Different polymer films can be bonded to one another, for example. Particularly good results are obtained in connection with the bonding of polymer films to metal foils, for example aluminum, or metallized films.

An advantage of the invention is that a very wide range of substrates can be bonded to one another, ie. laminated, with the novel dispersion having good adhesion to the substrates and bringing about a high strength of the bonded composite. In particular, the immediate strength is very high, thereby enabling further processing to be carried out rapidly, for example.

EXAMPLES

I Preparing Emulsion Polymers

The polymers were prepared in accordance with the following general procedure:

The initial charge (composition see Table 1) was heated to 85° C. (internal temperature). Then feed stream 1 and feed stream 2 were begun.

Feed stream 2 consisted of 3.0 g of sodium peroxodisulfate (initiator) in 39.9 g of water.

Feed stream 1 contained the emulsified monomer mixture. The composition of feed stream 2 is likewise indicated in Table 1.

Feed stream 1 was metered in over 3 h. 20% of feed stream 2 was added over 10 minutes and the remainder over 2 h 50 min (procedure 1) or over 3 h 20 min (procedure 2). After the end of the feed streams, polymerization was continued at 85° C. for half an hour.

The composition of the resulting emulsion polymers 1 to 13 is shown in Table 2.

TABLE 1

Composition of the initial charge and of feed stream 1

| | Initial charge | | | | Feed stream 1 | | | | | | |
|---|---|---|---|---|---|---|---|---|---|---|---|
| $H_2O$ [g] | Styrene seed 10% in water [g] | Styrene seed 33% in water [g] | $H_2O$ [g] | SLS 15% in water [g] | IRA 60% in water [g] | DOW 45% in water [g] | Ar. 15% in water [g] | t-DMC 100% [g] | DVB 100% [g] | Monomers 100% [g] | Procedure |
| 1 312 | 5 | | 450 | 13.3 | 6.7 | 14.4 | | 2 | 1 | 1000 | 1 |
| 2 312 | 5 | | 449.2 | 13.3 | 6.7 | 14.4 | | 2 | | 1000 | 1 |
| 3 312 | 5 | | 448.2 | 13.3 | 6.7 | 14.4 | | 2.5 | | 1000 | 1 |
| 4 317.5 | 5 | | 447.7 | 13.3 | 6.7 | 14.4 | | 1.8 | | 1000 | 1 |
| 5 317.5 | 5 | | 447.8 | 13.3 | 6.7 | 14.4 | | 2 | | 1000 | 1 |
| 6 317.5 | 5 | | 447.7 | 13.3 | 6.7 | 14.4 | | 1.8 | | 1000 | 1 |
| 7 317.5 | 5 | | 447.7 | 13.3 | 6.7 | 14.4 | | 1.8 | | 1000 | 1 |
| 8 317.5 | 5 | | 418.6 | | 6.7 | 14.4 | 53.3 | 1.8 | | 1000 | 1 |
| 9 317.5 | 5 | | 447.4 | 13.3 | 6.7 | 14.4 | | 1.8 | | 1000 | 1 |
| 10 317.5 | 5 | | 447.7 | 13.3 | 6.7 | 14.4 | | 1.8 | | 1000 | 1 |
| 11 317.5 | 5 | | 447.7 | 13.3 | 6.7 | 14.4 | | 0.22 | | 1000 | 1 |
| 12 317.5 | 5 | | 447.7 | 13.3 | 6.7 | 14.4 | | 0.22 | | 1000 | 1 |
| 13 317.5 | 5 | | 447.7 | 13.3 | 6.7 | 14.4 | | 0.22 | | 1000 | 1 |

Abbreviations
SLS: sodium lauryl sulfate
IRA: Lumiten IRA
Dow: Dowfax 2A1
Ar.: arylsulfonate
t-DMC: tert-dodecyl mercaptan
DVB: divinylbenzene

TABLE 2

Composition of the emulsion polymers in % by weight

| | AA | IA | GMA | HEA | BA | MA | MMA | EHA | S |
|---|---|---|---|---|---|---|---|---|---|
| 1 | 3 | | | | 56 | 5 | 8 | 28 | |
| 2 | 3 | | 0.5 | 0.5 | 51 | 10 | 7 | 28 | |
| 3 | 3 | | | | 56 | | 8 | 28 | 5 |
| 4 | 3 | | | | 56 | | 10 | 28 | 3 |
| 5 | 3 | | | | 51 | | | 33 | 13 |
| 6 | 3 | | | | 46 | | | 38 | 13 |
| 7 | 3 | | | | 43 | | | 41 | 13 |
| 8 | 3 | | | | 46 | | | 38 | 13 |
| 9 | 3 | | | | 46 | 13 | | 38 | |
| 10 | 3 | | | | 51 | | | 33 | 13 |
| 11 | 3 | | | | 51 | | | 33 | 13 |
| 12* | 3 | | | | — | | | 84 | 13 |
| 13* | 3 | | | | 84 | | | — | 13 |

Abbreviations
AA: acrylic acid
IA: itaconic acid
GMA: glycidyl methacrylate
HEA: 2-hydroxyethyl acrylate
BA: n-butyl acrylate
MA: methyl acrylate
MMA: methyl methacrylate
EHA: ethylhexyl acrylate
S: styrene
*for comparison II Performance Tests
A) Composite Films
Producing the Composite Films and Determining the Peel Strength The dispersions of the emulsion polymers were knife-coated with a dry-film thickness of 2–3 g/m² on various films which had been heated to 50° C. (polyethylene terephthalate: PETP; polyamide; PA; polypropylene (corona-pretreated): PP, aluminum: Alu), and after 20 seconds were laminated with a corona-pretreated polyethylene film (PE). The resulting film laminates were then stored for 1 day at room temperature under standard climatic conditions and then cut into strips 15 mm wide. These strips were then peeled at an angle of 180° C. and at a rate of 100 m/min at 23° C. The peel strength found for the 15 mm wide strips, in N, was measured. The results are given in Table 3.

TABLE 3

Peel strengths in N/15 mm

| Polymer | PETP/PE | PA/PE | PP/BE | Alu/PE | PETP/Alu | metall. PETP/PE* |
|---|---|---|---|---|---|---|
| 1 | 3.1 | 2.4 | 2.3 | 3.3 | 3.5 | |
| 2 | 2.8 | 2.5 | 2.2 | 3.2 | 3.3 | 3.3 |
| 3 | 2.7 | 3.0 | 2.8 | 4.5 | 4.0 | 3.2 |
| 4 | 3.8 | 3.7 | 3.0 | 4.5 | 5.1 | 3.1 |
| 5 | 3.1 | 3.0 | 2.4 | 4.7 | 4.0 | 2.9 |
| 6 | 2.3 | 3.2 | 2.4 | 3.0 | 3.4 | 2.5 |
| 7 | 2.8 | 3.0 | 2.7 | 3.7 | 3.7 | 2.3 |
| 8 | 2.9 | 3.0 | 2.5 | 3.8 | 3.3 | 3.0 |

TABLE 3-continued

Peel strengths in N/15 mm

| Polymer | PETP/PE | PA/PE | PP/BE | Alu/PE | PETP/Alu | metall. PETP/PE* |
|---|---|---|---|---|---|---|
| 9 | 3.2 | 3.2 | 2.3 | 3.8 | 3.0 | 2.7 |
| 10 | 2.5 | 2.6 | 2.0 | 3.7 | 2.2 | 1.4 |
| 11 | 2.9 | 3.3 | 2.7 | 3.8 | 3.6 | 3.1 |
| 12 | 0.5 | 0.6 | 0.7 | 1.3 | 1.3 | 0.6 |
| 13 | 2.2 | 2.5 | 2.1 | 3.1 | 3.8 | 1.8 |

*PETP film vapor-coated with metal

Determining the Immediate Strength

Another advantage of the novel dispersions is regarded as being the high immediate strength of the composites produced. This high immediate strength (peel strength measured directly after production of the composite) offers the advantage that the film laminate can be subjected rapidly to further processing. This further processing can be the production of a triple laminate starting from dual laminate, or further operations on the laminate (cutting, punching, folding, sealing). The comparative example is a 2-component system comprising an acrylic polymer dispersion (Acronal® DS 3480) including an isocyanate crosslinker.

Immediate Strength

| Polymer | PETP/PE | PA/PE | PP/PE | ALU/PE | PETP/ALU |
|---|---|---|---|---|---|
| 3 | 1.5 | 2.0 | 2.0 | 3.0 | 2.4 |
| Acronal DS 3480 X | 0.2 | 0.4 | 0.3 | 1.4 | 0.7 |

B) High-gloss Films
Preparing Polymer dispersions 14 and 15
Polymer 14

| Initial charge: | | |
|---|---|---|
| | 312.0 g of water | |
| 0.05% | 5.0 g of styrene seed | 10.0% strength |
| Feed stream 1: | | |
| | 449.5 g of water | |
| 0.20% | 13.3 g of Steinapol NLS | 15.0% strength |
| 0.40% | 8.0 g of Lumiten IRA | 50.0% strength |
| 0.65% | 14.4 g of Dowfax 2A1 | 45.0% strength |
| 0.10% | 4.0 g of NaOH | 25.0% strength |
| 3.00% | 30.0 g of acrylic acid | 100.0% strength |
| 56.00% | 560.0 g of n-butyl acrylate | 100.0% strength |
| 5.00% | 50.0 g of styrene | 100.0% strength |
| 8.00% | 80.0 g of methyl methacrylate | 100.0% strength |
| 28.00% | 280.0 g of 2-ethylhexyl acrylate | 100.0% strength |
| Feed stream 2: | | |
| 0.30% | 3.0 g of sodium peroxodisulfate | 100.0% strength |
| | 39.9 g of water | |

Procedure:
  Heat initial charge to 85° C.
  Begin feed streams simultaneously at 85° C.
  Feed time:
    feed stream 1 over 3 h
    feed stream 2: 20% over 10 minutes, remainder over 2 h 50 min
  After the end of addition, continue polymerization at internal temp. of 85° C. for 0.5 h
  Adjust pH to 7–8 using NaOH Polymer 15

| Initial charge: | | |
|---|---|---|
| | 312.0 g of water | |
| 0.05% | 5.0 g of styrene seed | 10.0% strength |
| Feed stream 1: | | |
| | 451.6 g of water | |
| 0.20% | 13.3 g of Steinapol NLS | 15.0% strength |
| 0.40% | 8.0 g of Lumiten IRA | 50.0% strength |
| 0.65% | 14.4 g of Dowfax 2A1 | 45.0% strength |
| 3.00% | 30.0 g of acrylic acid | 100.0% strength |
| 56.00% | 560.0 g of n-butyl acrylate | 100.0% strength |
| 5.00% | 50.0 g of styrene | 100.0% strength |
| 8.00% | 80.0 g of methyl methacrylate | 100.0% strength |
| 28.00% | 280.0 g of 2-ethylhexyl acrylate | 100.0% strength |
| Feed stream 2: | | |
| 0.30% | 3.0 g of sodium peroxodisulfate | 100.0% strength |
| | 39.9 g of water | |

Procedure:
  Heat initial charge to 85° C.
  Begin feed streams simultaneously at 85° C.
  Feed time:
    feed stream 1 over 3 h
    feed stream 2: 20% over 10 minutes, remainder over 2 h 50 min
  After the end of addition, continue polymerization at internal temp. of 85° C. for 0.5 h
  Adjust pH to 7–8 using NaOH High-gloss Film Lamination with Card and Polypropylene (Corona-pretreated)

The pretreated side of the polypropylene film was coated with adhesive. After drying in cold air, the card was placed on and the assembly was rolled down using a laboratory laminating roller. After being cut to size, the laminates were compressed in a roller press.

The adhesion was tested by peeling the film from the card at an angle of about 180 degrees.

Assessment:
  1=Full tearing of paper or paint
  2=Partial tearing of paper or paint
  3=Good adhesion, with adhesive fracture of card or film (AC, AF)
  4=Poor adhesion with AC or AF
  5=No adhesion to card or film In order to determine the groove stability, the laminated samples were given a groove 24 hours after the above production.

Evaluation of the Groove

1=Groove is entirely satisfactory
  2=Groove has opened slightly only at isolated points
  3=Groove has opened noticeably at certain points
  4=Groove is completely open The results are summarized in Table 4.

TABLE 4

| Polymer | Adhesion | | | Groove condition | | |
|---|---|---|---|---|---|---|
| | after 1 day | after 1 week | after 6 weeks | after 1 day | after 1 week | after 6 weeks |
| 14 | 3 | 2–3 | 2–3 | 1 | 1 | 1 |
| 15 | 2 | 2 | 2 | 1 | 1 | 1 |

We claim:

1. A laminate of paper or card, comprising thereon a transparent polymer film bonded thereto with an adhesive polymer, said adhesive polymer being produced from a monomer mixture, comprising:
   a) from 5–95% by weight of a mixture with at least one $C_2$–$C_4$-alkyl acrylate and at least one $C_6$–$C_{12}$-alkyl acrylate (monomers a);
   b) from 5–30% by weight of ethylenically unsaturated compounds having a glass transition temperature of above 0° C. and containing no functional groups other than the ethylenically unsaturated group (monomers b);
   c) from 0–10% by weight of ethylenically unsaturated compounds having at least one acid group or acid anhydride group (monomers c); and
   d) from 0–60% by weight of further ethylenically unsaturated compounds (monomers d);
   the weight percentages being based on the adhesive polymer, or of an aqueous dispersion of the adhesive polymer.

2. The laminate of claim 1, wherein for said adhesive polymer, monomers a) comprise from 10–90% by weight of $C_2$–$C_4$-alkyl acrylates and from 90–10% by weight of $C_6$–$C_{12}$-alkyl acrylates.

3. The laminate of claim 1, wherein said adhesive polymer is produced from:
   65–95% by weight of monomers a);
   from 5–25% by weight of monomers b);
   from 0–10% by weight of monomers c); and
   from 0–10% by weight of monomers d).

4. The laminate of claim 1, wherein said adhesive polymer is produced from:
   65–92.5% by weight of monomers a);
   from 5–25% by weight of monomers b);
   from 2.5–10% by weight of monomers c); and
   from 0–10% by weight of monomers d).

5. The laminate of claim 1, wherein said adhesive polymer is prepared by emulsion polymerization of the monomers a)–d) in the presence of from 0.05 to 0.8 parts by weight of a regulator per 100 parts by weight of the monomers a)–d) to be polymerized.

6. The laminate of claim 1, wherein said monomers a) comprise n-butyl acrylate or ethyl acrylate as said $C_2$–$C_4$-alkyl acrylate, and n-hexyl-, 2-ethylhexyl-, octyl-, decyl- or dodecyl acrylate as said $C_6$–$C_{12}$-acrylate.

7. The laminate of claim 6, wherein said $C_2$–$C_4$-alkyl acrylate is n-butyl acrylate, and said $C_6$–$C_{12}$-alkyl acrylate is 2-ethylhexyl acrylate.

8. The laminate of claim 1, wherein said monomers a) have a glass transition temperature of below 0° C.

9. The laminate of claim 1, wherein said monomers b) have a glass transition temperature of above 0° C.

10. The laminate of claim 9, wherein said monomers b) have a glass transition temperature of above 15° C.

11. The laminate of claim 1, wherein said monomers b) comprise $C_1$–$C_{20}$-alkyl (meth)acrylates, vinyl esters of carboxylic acids with up to 20 carbons, vinyl aromatic carbons of up to 20 carbons, ethylenically unsaturated nitriles or vinyl halides having a glass transition temperature of above 0° C.

12. The laminate of claim 11, wherein said monomers b) comprise methyl acrylate, methyl methacrylate, butyl methacrylate, vinyl laurate, vinyl stearate, vinyl propionate, vinyl acetate, versatic acid vinyl ester, vinyl toluene, α- and p-methylstyrene, (α-butylstyrene, 4-n-butylstyrene, 4-n-decylstyrene, styrene, acrylonitrile, methacrylonitrile, vinyl chloride or vinylidene chloride.

13. The laminate of claim 1, wherein said monomers c) comprise (meth)acrylic acid, maleic acid, maleic anhydride, maleic monoester or fumaric monoester.

14. The laminate of claim 1, wherein said monomers d) have a glass transition temperature of below 0° C.

15. The laminate of claim 1, wherein said monomers d) comprise $C_1$–$C_{10}$-hydroxyalkyl (meth)acrylates or are as defined for monomers b).

16. The laminate of claim 1, wherein said adhesive polymer has a glass transition temperature of from −50 to +60° C.

17. The laminate of claim 16, wherein said adhesive polymer has a glass transition temperature of from −30 to +40° C.

18. The laminate of claim 17, wherein said adhesive polymer has a glass transition temperature of from −30 to +20° C.

19. The laminate of claim 1, wherein said adhesive polymer does not contain tackifiers, plasticizers or crosslinker.

20. The laminate of claim 1, wherein said transparent polymer film is polypropylene.

21. The laminate of claim 20, wherein said polypropylene is corona-pretreated.

22. The laminate of claim 1, which is glossy.

23. The laminate of claim 1, wherein the adhesive polymer contains neither sulfo nor sulfonate groups.

24. The laminate of claim 1, which is of paper.

25. The laminate of claim 1, which is of card.

* * * * *